US011000762B2

(12) United States Patent
Hollingsworth

(10) Patent No.: US 11,000,762 B2
(45) Date of Patent: May 11, 2021

(54) PORTABLE DEVICE AND SYSTEM

(71) Applicant: Sony Interactive Entertainment Inc., Tokyo (JP)

(72) Inventor: William Michael James Hollingsworth, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/564,765

(22) Filed: Sep. 9, 2019

(65) Prior Publication Data

US 2020/0078674 A1    Mar. 12, 2020

(30) Foreign Application Priority Data

Sep. 12, 2018  (GB) ...................................... 1814843

(51) Int. Cl.
*A63F 13/285* (2014.01)
*A63F 13/24* (2014.01)
*G06F 3/01* (2006.01)

(52) U.S. Cl.
CPC ............ *A63F 13/285* (2014.09); *A63F 13/24* (2014.09); *G06F 3/016* (2013.01)

(58) Field of Classification Search
IPC .................................. A63F 13/285; G06F 3/16
See application file for complete search history.

(56) References Cited

U.S. PATENT DOCUMENTS

| 5,736,978 | A   | 4/1998  | Hasser   |            |
|-----------|-----|---------|----------|------------|
| 6,762,749 | B1  | 7/2004  | Gouzman  |            |
| 7,113,177 | B2* | 9/2006  | Franzen  | G06F 3/0414 |
|           |     |         |          | 345/173    |
| 7,432,912 | B2* | 10/2008 | Cote     | G06F 1/1626 |
|           |     |         |          | 345/168    |

(Continued)

FOREIGN PATENT DOCUMENTS

| EP | 2460568 A1    | 6/2012 |
| WO | 2018144289 A1 | 8/2018 |

OTHER PUBLICATIONS

Extended European Search Report for corresponding EP Application No. 19183568.5, 11 pages, dated Dec. 17, 2019.

(Continued)

*Primary Examiner* — Jay Trent Liddle
(74) *Attorney, Agent, or Firm* — Matthew B. Dernier, Esq.

(57) ABSTRACT

A system includes a portable device for providing tactile feedback to a user, and a handheld games controller, the games controller including a receiving portion for securing the portable device to the games controller via the connecting portion; the portable device including a communication interface operable to receive text information, a tactile pad including a plurality of touch elements for generating a respective tactile output, a connecting portion for securing the portable device to a handheld games controller, and a processor configured to receive the text information and to control the tactile output of at least some of the touch (Continued)

elements based on the received text information; the handheld games controller including a touch sensitive surface; and where the portable device is positioned over the touch sensitive surface, and pressure applied by a user onto the portable device is relayed to the touch sensitive surface of the handheld games controller.

14 Claims, 4 Drawing Sheets

(56) References Cited

U.S. PATENT DOCUMENTS

| | | | |
|---|---|---|---|
| 2011/0201427 A1* | 8/2011 | Matsumoto | A63F 13/10 463/36 |
| 2012/0268412 A1 | 10/2012 | Cruz-Hernandez et al. | |
| 2012/0299853 A1* | 11/2012 | Dagar | G09B 21/003 345/173 |
| 2014/0132568 A1* | 5/2014 | Hirose | G06F 3/016 345/175 |
| 2015/0024844 A1* | 1/2015 | Mon Pere | A63F 13/2145 463/31 |
| 2015/0363365 A1 | 12/2015 | Campbell | |
| 2016/0018890 A1* | 1/2016 | Deokar | G06F 3/016 715/702 |
| 2017/0372566 A1 | 12/2017 | Do | |
| 2018/0214771 A1* | 8/2018 | Tran | A63F 13/92 |
| 2018/0214779 A1 | 8/2018 | Tran | |
| 2018/0214780 A1* | 8/2018 | Tran | A63F 13/21 |
| 2020/0118463 A1* | 4/2020 | Khermayer | G09B 21/004 |

OTHER PUBLICATIONS combined Search and Examination Report for corresponding GB Application No. 1814843.7, 5 pages, dated Feb. 20, 2019.
Communication Pursuant to Article 94(3) EOC for corresponding EP Application No. 19183568.5, 6 pages, dated Mar. 11, 2021.

* cited by examiner

PORTABLE DEVICE AND SYSTEM

BACKGROUND OF THE INVENTION

Field of the Invention

The present disclosure relates to a portable device and a system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Currently, the accessibility of video games to the blind or visually impaired is limited. In known systems, accessibility features such as text to speech are typically used to output on-screen text and contextual information to the user. However, the outputting of this text-to-speech often results in an interruption or suppression of audio that would otherwise have been output during the playing of the video game. In turn, this can disrupt the flow of the video game, resulting in a breaking of immersion for the blind or visually impaired player.

Other known accessibility features for the visually impaired include: zooming functionality, text size and boldness controls, contrast settings and colour inversion. However, even with these there is usually an interruption to the content that would normally be displayed during the playing of the video game. This might include, for example, a re-configuring and re-sizing of various displayed elements to accommodate a larger text size. Again, this can take the user out of the game and result in a breaking of immersion.

The present disclosure seeks to address or at least alleviate these problems.

SUMMARY OF THE INVENTION

According to a first aspect disclosed herein, there is provided a system in accordance with claim 1.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
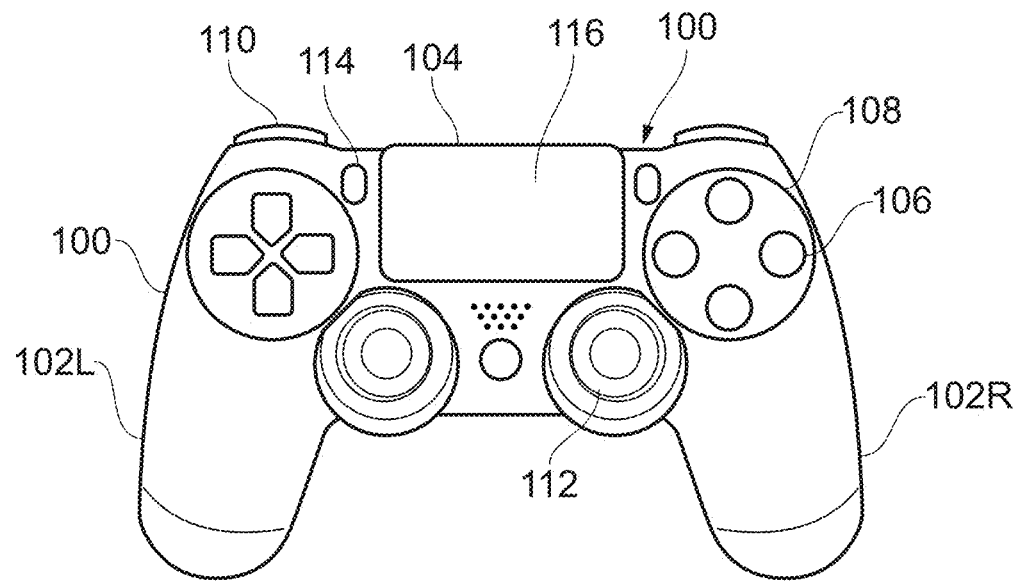
FIG. 1 shows schematically an example of a games controller.

Referring now to the drawings, wherein like reference numerals designate identical or corresponding parts throughout the several views, FIG. 1 shows schematically an example of a games controller 100. The games controller 100 is for utilization as an input device for an information processing apparatus (not shown). The information processing apparatus is operable to execute game programs and to provide a user with interactive content. The information processing apparatus may also have access to, and enable communication via, the internet. In one example, the information processing apparatus is a games console, such as the PS4™ or PS5™ and the games controller is a PS4 DualShock™.

The games controller 100 is capable of communicating with the information processing apparatus via a wired and or wireless connection. The games controller 100 is configured to transmit input signals to the information processing apparatus. The input signals provide an indication of e.g. specific button presses received at the controller 100, movement of the controller 100, audio received at a microphone at the controller 100, etc. The games controller 100 is also configured to receive signals output by the information processing apparatus. These signals may be used to control one or more of e.g. a vibration, audio and light that is output by the games controller 100.

In FIG. 1, the games controller 100 comprises left and right hold sections 102L, 102R to be held by a user. The hold sections 102L, 102R are located to be spaced apart from each other in the left-right direction and are interconnected by a central section 104. The hold sections 102L, 102R each comprise a plurality of operating members 106 for receiving user input. In FIG. 1, these operating members 106 are shown at an upper part 108 of each hold section 102L, 102R. The upper part 108 of each hold section also includes a protruding portion (located at the top when viewed in plan view), at which further operating members 110 are provided. In some examples, a vibrator is located within the housing of each hold section 102L, 102R. The vibrator enables vibrational feedback to be output by the games controller 100.

The central section 104 comprises two analogue sticks 112, operating members 114 and a touch sensitive surface 116 (forming an upper surface of a touchpad). The two analogue sticks 112 allow a user to input a directional control, such as controlling the direction of movement of a character and/or a pose of a virtual camera. The operating members 114 may correspond to a 'share' button for capturing video of gameplay and an 'options' button for accessing game or system options. The touch sensitive surface 116 comprises a sensor for detecting a touch input. In some examples, the sensor is configured to detect a position on the touch sensitive surface 116 at which a touch input is received. The central section may also comprise one or more speakers (not shown) for outputting audio.

Generally, the operating members 106, 110, analogue sticks 112, operating members 114, and touch sensitive surface 116 are arranged on the controller 100 such that each of these can be accessed by one or more of a user's thumb or fingers, when the user is gripping the hold sections 102L, 102R in the palms of their hands.

The games controller 100 enables a user to interact with content that is being displayed via the information processing apparatus. Often, this content will include textual information that a user must read. In some cases, this may correspond to a system menu, where for example a user can view and configure various settings relating to the information processing apparatus. An example of such a system menu is the 'home screen' that is displayed on start-up of the PS4.

In other cases, the textual information may be displayed as part of e.g. a video game being executed at the information processing apparatus. This information may be displayed as part of e.g. an in-game menu in which a user can control various game settings and view their current progress in the game. The textual information may also be displayed as part of a virtual environment. For example, in many adventure or open world games, there are often puzzles or clues in the form of text or symbols that a user must interact with in order to progress in the game. In the present disclosure, textual information includes text, numbers and symbolic information (e.g. arrows, shapes, etc.).

In known systems, such as the PS4, various features are provided for improving the accessibility of content to blind or visually impaired players. These include a 'text-to-speech' feature for outputting on-screen text and contextual information as audio to a user. Other features include: a 'zoom' feature for zooming in on particular areas of displayed content; a 'larger text' and 'bolder text' feature for increasing the size and thickness of displayed text; an 'invert colour' feature for inverting displayed colours; and a 'high contrast' feature for increasing the contrast of images being displayed at a screen. While these are no doubt useful features, they often result in a sub-optimal experience for the visually impaired user.

Figure 2:
FIG. 2 shows a screenshot of an example of in-game information.

FIG. 2 shows an example of content that may be displayed to a user during the playing of a video game. In FIG. 2, the content corresponds to a virtual shop ('Huldra Shop') that a user may visit in the game 'God of War 4'. The displayed content includes textual and visual information. The textual information includes information about a currently selected in-game item, as well as statistics associated therewith and arrows indicating whether a statistic is increased or decreased by equipping the player's avatar with the item. The visual information includes the player's avatar adorning the currently selected in-game item.

In the example shown in FIG. 2, there is a relatively large amount of information being displayed to the user. As a result of this, the textual information is displayed with a small size. For a visually impaired user, this text may be difficult to read.

One solution would be to zoom in on a particular region of the screen. However, in doing so, this may limit the user's ability to see what their avatar looks like with the currently selected in-game item or easily access another part of the overall screen interface. The same problem may occur by increasing the size of the text, which would most likely require a re-sizing and re-positioning of the other displayed elements. Increasing the boldness of the text or contrast of the displayed image is also likely to be of limited help, especially if the size of the text is not increased.

The use of text-to-speech alleviates the need to reconfigure the displayed content. However, in most cases, the outputting of the 'text-to-speech' results in other audio being suppressed or completely replaced with the 'text-to-speech'. The suppressed or replaced audio might include for example background music or sound effects, dialogue being spoken between two characters, notifications (e.g. that a friend has come online), etc. Thus, the 'text-to-speech' limits the diversity of audio that a user can experience whilst playing the game. In the example of FIG. 2, this might correspond to the reading out loud of text portion 202, when otherwise the virtual shop keeper might have comment on the currently selected item. Furthermore, text-to-speech systems read all the detected text provided to them, at a fixed rate, making repeated use or navigation through extraneous material highly frustrating, particularly in a game context.

More generally, there is a problem with existing accessibility features in that they result in a breaking of immersion by interfering with the visual and/or audio content that is usually output during the display of interactive content. Clearly it would be desirable to prevent or at least limit this breaking of immersion.

Figure 3:
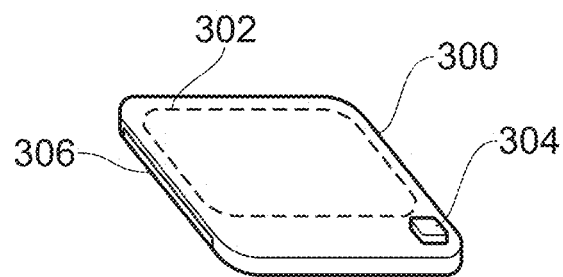
FIG. 3 shows schematically an example of a tactile output device in accordance with the present disclosure.

FIG. 3 shows schematically an example of a portable device 300 in accordance with the present disclosure. The portable device 300 comprises a communication interface (not shown) operable to receive text information. The text information may be received from an information processing apparatus. In some examples, the text information may be received from a games controller 100 that is in communication with the information processing apparatus and to which the portable device 300 is connected (discussed later in relation to FIG. 4), the games controller acting as receiver and relay. The text information may be generated as a result of the information processing apparatus executing a game program. As described previously, the text information may correspond to e.g. system menus, in-game menus, in-game text, etc.

The portable device 300 further comprises a tactile pad 302. The tactile pad 302 comprises a plurality of touch elements for generating a respective tactile output. Each touch element may correspond to a protrusion having a controllable displacement and/or size, or a vibrator for controlling a perceived friction at a surface layer located above the vibrator (not shown). The tactile output of each touch element is selectively controllable. This means that the tactile output at different locations on the tactile pad 302 can be individually controlled. Various methods for generating and controlling the tactile output at different locations on the tactile pad 302 will be described later, in relation to FIGS. 5 and 6. It will be appreciated that tactile pad 302 of the portable device is primarily an output device, whereas touch sensitive surface 116 of the controller is an input device.

The tactile output of the touch elements is controlled by a processor (not shown) of the portable device 300. The processor is configured to receive at least some of the text information as an input, and in response thereto, generate a tactile output corresponding to the received text information. In preferred embodiments, this corresponds to generating a braille version of the received text information. In some examples, the text information received at the communication interface may include a braille translation of a portion of text, and the processor may be configured to generate a tactile version of this translation. In other examples, the portable device 300 may be configured to translate the received text information into braille, and to then output that translation in the form of tactile feedback.

In some cases, there may be no braille translation for the received text information. For example, the received text information may include symbols such as runes, arrows, game-specific shapes etc. In these cases, the tactile output of the touch elements may be controlled so as to generate a tactile version of the symbol. This may correspond to generating a tactile output that corresponds to the shape of the symbol, or a simplified version thereof. In the example of FIG. 2, this may correspond generating a tactile version of an arrow, to indicate that an in-game statistic is increased or decreased by the currently selected in-game item. In other examples, braille versions of non-translatable shapes or symbols may be provided by the information processing apparatus (e.g. as part of a game program being executed thereat). Alternatively or in addition, touch elements may be cycled to form tactile animations, for example with rows of touch elements activating in sequence upwards or downwards to indicate direction, or similarly columns of touch elements activating in sequence to the left or right to indicate direction. Other tactile animations may be considered by a developer of a tactile UI.

The portable device 300 is optionally operable to receive a touch input. In some examples, the tactile pad 302 is operable to receive the touch input. The touch input may be received as a result of a user moving their finger across the tactile pad 302 so as to feel the tactile feedback generated by the one or more touch elements. In these examples, the tactile pad 302 comprises a touch sensor configured to detect a touch input. The touch sensor may be operable to detect a single or multi-touch input. The touch sensor may be e.g. a capacitive or resistive touch sensor. In some embodiments, a plurality of touch sensors may be used, each being located at a different position on (or within) the tactile pad 302. Optionally, alternatively or in addition, the portable device may relay touch/pressure upon it to a touch/pressure sensitive input portion of a hand held games controller 100, as described later herein.

In some examples, portable device 300 comprises at least one physical button 304. The physical button 304 may provide a further means through which a touch input can be received at the portable device 300. The button 304 may be a protrusion on the upper surface of the portable device 300 or form part of the upper surface itself. The button 304 may act as a touch sensor in that, when a pressing-down operation is performed, a corresponding voltage is generated (e.g. by the closing of a circuit), which in turn can be used to infer the receipt of a touch input from a user at the portable device 300.

The portable device 300 is releasably attachable to a hand held games controller 100. As a result, the portable device 300 has a relatively small size, i.e. being smaller than the games controller 100. In turn, this means that the tactile pad 302, i.e. the area for outputting tactile information, is limited. Generally, the amount of text information that can be output by the tactile pad 302 will depend on the on the number of touch elements used and the minimum spatial resolution at which visually impaired users can (on average) resolve differences in tactile feedback. In one example, it may be that only one or two lines of text are output at a time, by the tactile pad 302 during use. The outputting of different portions of text may cause a previously displayed portion of text to be removed, or to be displayed at a higher position on the tactile pad 302, for example.

In the example shown in FIG. 3, the portable device 300 comprises a physical button 304 dedicated to controlling the portion of text that is to be rendered by the tactile pad 302. The physical button 304 may be simple button that can be pressed down by a user. The pressing down of this button 304 may cause the next portion of text in the received text information to be output for feeling by the user. It will be appreciated that additional buttons could also be provided, such as a 'back' button to complement the 'next' button.

In other examples, the physical button 304 may be rotatable or pivotable about an axis such that a directional input can be provided by the user. The direction of the input may correspond to e.g. up, down, left or right, and may be used to control whether a previous or subsequent portion of the received text information is rendered. In some examples, the physical button 304 may make a noise, such as a clicking sound, each time a directional input is received by the user. This may help a user to keep track of how far forward or backward they are scrolling through different text portions.

Additionally or alternatively, the portable device 300 may be provided with one or more other physical buttons 304 for skipping to the beginning or end of the received text information. Generally, it is desirable that as few physical buttons 304 as possible are present on the portable device 300, since the space for outputting text is already limited. For this reason, the same physical button 304 may be used for performing multiple different operations.

In FIG. 3, to the physical button 304 may be operable to perform both operations of skipping to successive portions of text, and skipping to an end portion of text (i.e. at the end of the body of the received text information). It may be for example that, the pressing down of the button 304 for longer than a pre-determined period, e.g. 2s, causes the last portion of text in the received text information to be rendered by the tactile pad 302. Another physical button (not shown) may be provided at e.g. the top left of the touchpad, for re-rendering previous portions of text and skipping to the beginning of the received text portion. It will be appreciated that this is just an illustrative example and that other arrangements of physical buttons 304 may be provided.

In some embodiments, the touchpad itself may form a physical button. For example, the tactile pad 302 may be depressable relative to the rest of the portable device 300. The pressing down of this button may cause the next line of text to be rendered at the tactile pad 302, for example. In this way, the tactile pad 302 may act as a large button that can easily be found and accessed by a visually impaired user. However, it also means that the tactile pad 302 must offer enough resistance (e.g. via springs) to ensure that the user does not accidentally press the button whilst they are feeling the current portion of rendered text.

Additionally or alternatively, the communication interface may be configured to receive an indication of button presses received at the controller 100 and these may be used to control the portion of text that is displayed at the tactile pad 302. For example, the left and right arrows on the d-pad provide a natural means for scrolling to a previous or subsequent portion of text in the body of received text information. Scrolling braille on the portable device may take the form of successively shifting braille character representations to the left (or to the right in a language reading in that direction), with old characters being dropped off the left (or right) end, and new characters added as required to the right (or left) end. To skip to the beginning or end of the text (or to a previous or subsequent chapter), the user may use a different respective one of the operating members 106, for example. The use of buttons 106 on the controller 100 for performing these operations is advantageous because it means that more room is available for rendering braille. However, this also limits the ability to use the portable device 300 as a standalone device.

Accordingly, alternatively or in addition, optionally operation of the physical button 304 (or any other predefined button on the portable device, or indeed on the associated videogame controller) may be interpreted as a 'shift' or 'all' button, causing inputs from one or more other parts of the associated controller to be interpreted differently by the UI; for example, whilst pressing the physical button, the joystick 112 may be used to navigate within the currently output text, or the shoulder buttons may be used to skip a predetermined number of characters or words, or jump to the previous/next sentence, for example. Once the physical button 304 is released, the joystick, shoulder buttons etc. then revert to their in-game input functions. This makes it easier to accommodate text navigation within a game, and indeed potentially to retro-fit or impose the functionality on existing games. Furthermore, by decoupling the braille UI input functions from the game input functions, a common input scheme may be provided on the controller that does not have to be adapted to accommodate different requirements for different games.

Hence more generally, in a first mode of a video game machine such as the PS4, one or more inputs of the handheld games controller are interpreted by the video game machine as controls for a videogame running on the machine, e.g. in a conventional fashion, but in a second mode of the video game machine, selected in response to a predetermined action by the user (such as pressing the physical button or another predetermined button), those one or more inputs of the handheld games controller are instead interpreted by the video game machine as controls for tactile output of text information by the portable device, e.g. for navigation of the available text.

In some embodiments, the tactile pad 302 may render new portions of text in response to detecting that a user has moved their finger over at least some or all of the text that is currently being rendered at the tactile pad 302. In some examples, this may involve detecting that a touch input has been received at a plurality of pre-determined locations on the tactile pad 302. The tactile pad 302 may comprise a pre-determined portion for rendering braille, and the pre-determined locations may be distributed along this portion. The touchpad (or rather, the processor thereof) may be configured to render a new portion of braille if touch inputs are detected at these locations, in a pre-determined order. The pre-determined order may correspond to e.g. a user moving their finger from left to right over the rendered text portion. In some examples, the locations may not be pre-determined but may coincide with the locations at which braille is being rendered. Further examples of such touch detection will be described later, in relation to FIGS. 5 and 6.

The tactile pad 302 may further comprise an electrical connector (not shown) for receiving power. In some examples, the electrical connector may be operable to receive power from a power source, such as the mains or a mains adapter, so that the portable device 300 can be charged independently of a games controller 100. Additionally or alternatively, the electrical connector may be operable to receive power from a handheld games controller 100 to which the portable device 300 is attached (when the games controller is switched on and in use). The handheld games controller 100 may be configured to receive power from the games console that it is connected to, e.g. via a wired connection. In some examples, the portable device 300 may be provided with the games controller 100 and only receive power via the games controller 100. This may be the case where the portable device 300 is secured to the games controller 100 with e.g. screws and cannot easily be detached from the games controller 100 by the user.

In FIG. 3, the portable device 300 is shown as comprising a connecting portion 306. The connecting portion 306 is configured to enable the portable device to be releasably attached to a handheld games controller 100, as will be described in relation to FIG. 4.

Figure 4:
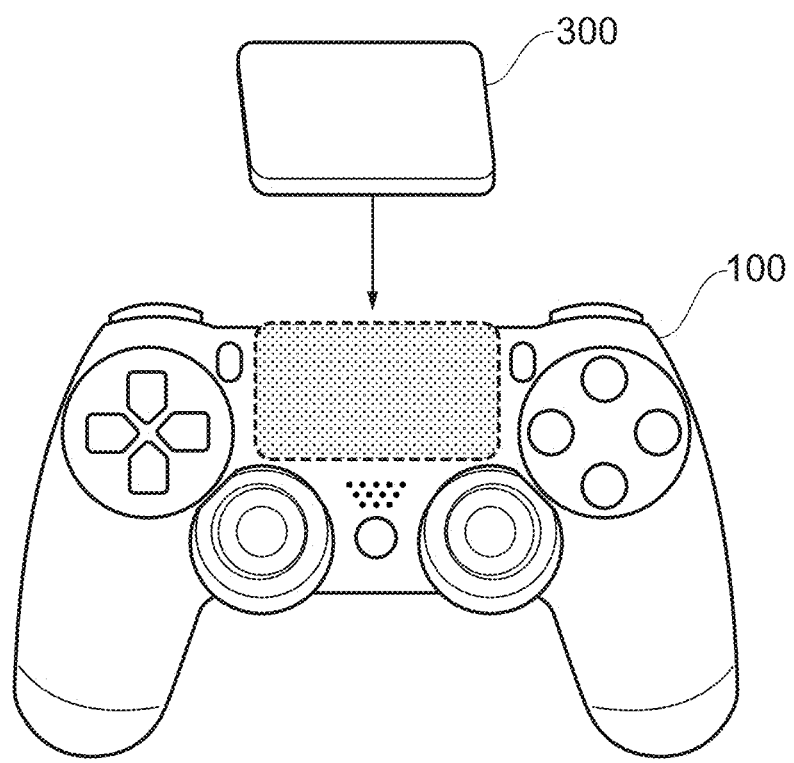
FIG. 4 shows schematically an example of a system comprising a games controller and a tactile output device.

In FIG. 4, the portable device 300 is shown as having a size and shape that corresponds to the size and shape of an existing touchpad 116 that the games controller 100 is provided with. The portable device 300 may be attached to the controller by replacing the existing touchpad 116, or by being fitted over the touchpad 116.

In some embodiments, the games controller 100 may be provided with the portable device 300 already fitted (i.e. as part of a special version of the games controller 100 that a visually impaired user can purchase).

In other embodiments, the portable device 300 is releasably attachable to the games controller 100. For example, the games controller 100 may be fitted with a slot for receiving the connecting portion 306 of the touchpad. The connecting portion 306 may include e.g. a ridge that is slightly larger than the diameter of the slot, but with the slot being resilient enough to fit around the connecting portion under tension. In other examples (not shown), the portable device 300 may comprise one or more clips for attaching the device 300 to the games controller 100. Alternatively, the games controller 100 may comprise one or more clips for receiving the respective connecting portions of the portable device 300.

In one example, the portable device 300 may be provided with a single clip that fits over and follows the contours of the top surface of the central section 104, and at least some of the rear side of the games controller 100. In this example, the games controller 100 acts so as to force apart the front of the touchpad and the clip wrapped around the rear of the controller.

Generally, any means for attaching the portable device 300 to the games controller 100 may be used, so long as the portable device 300 is located at a central position on the central section 104, when in use. It is desirable to locate the portable device 300 at this position since the user will generally have an idea of where it is located (due to their existing familiarity with the games controller 100) and it can easily be accessed by one or more of the user's fingers or thumbs, when the left and right hold sections 102L, 102R are being held by the user.

When the portable device is located over the existing touchpad 116, it will appreciated that the portable device may then relay touch/pressure exerted on its upper surface to the existing touchpad. This may be used for further input by the user, whether deliberately or not; for example, the location of finger pressure on the portable device may be detected by the existing touchpad beneath, enabling automatic refresh of the braille text to provide new text when the user reaches the end of the currently presented text, or similarly causing the braille to scroll, as described previously. Meanwhile, the button 304 may simply press through to the existing touchpad, such that pressure in an area of the touchpad corresponding to the location the button is interpreted as the button press, thereby potentially avoiding the need for any outbound control signals from the portable device by instead making use of available inputs on the host controller.

Whilst positioning the portable device over an existing touchpad may provide such advantages, it will be appreciated that the portable device does not need to be positioned over the touchpad. For example, it may be located between the handles 102L,R of the controller.

Similarly, it will be appreciated that many braille users read braille with their index and middle fingers rather than with their thumbs. However, in normal use when holding a videogame controller, the user's fingers are on the back of the device and only the thumbs are on the front.

It may therefore be advantageous to place the portable device on the rear of the controller (i.e. on the side opposite to the thumb-controlled joysticks 112 and buttons 108). In this case, the portable device may placed asymmetrically so as to be located where the normal reading fingers of the user will lie, for example the index and/or middle fingers of the left or right hand. Optionally a mounting frame for the portable device can be provided that can move between left and right positions, or separate left and right handed mounting frames can be provided and the appropriate one selected by the user. Typically in this case the portable device would thus be located substantially opposite one of the left or right joysticks on the rear of the controller, and/or located on the rear of and running parallel to at least a portion of one of the handles of the controller.

In some examples, the tactile pad 302 may be provided as being fixed to the hand held games controller 100. For example, the tactile pad 302 may be provided as a component that is embedded within the games controller 100 via e.g. screws, and may be removed via the unscrewing of said screws. In one example, the conventional touchpad (comprising touch sensitive surface 116) may be replaced with the tactile pad 302 of the present disclosure. Generally, it may be that a user is not required to attach the tactile pad 302 to their hand held games controller, but rather, the tactile pad 302 is provided as part of the games controller 100 and optionally may be subsequently removable by the user, should they wish to.

Figure 5:
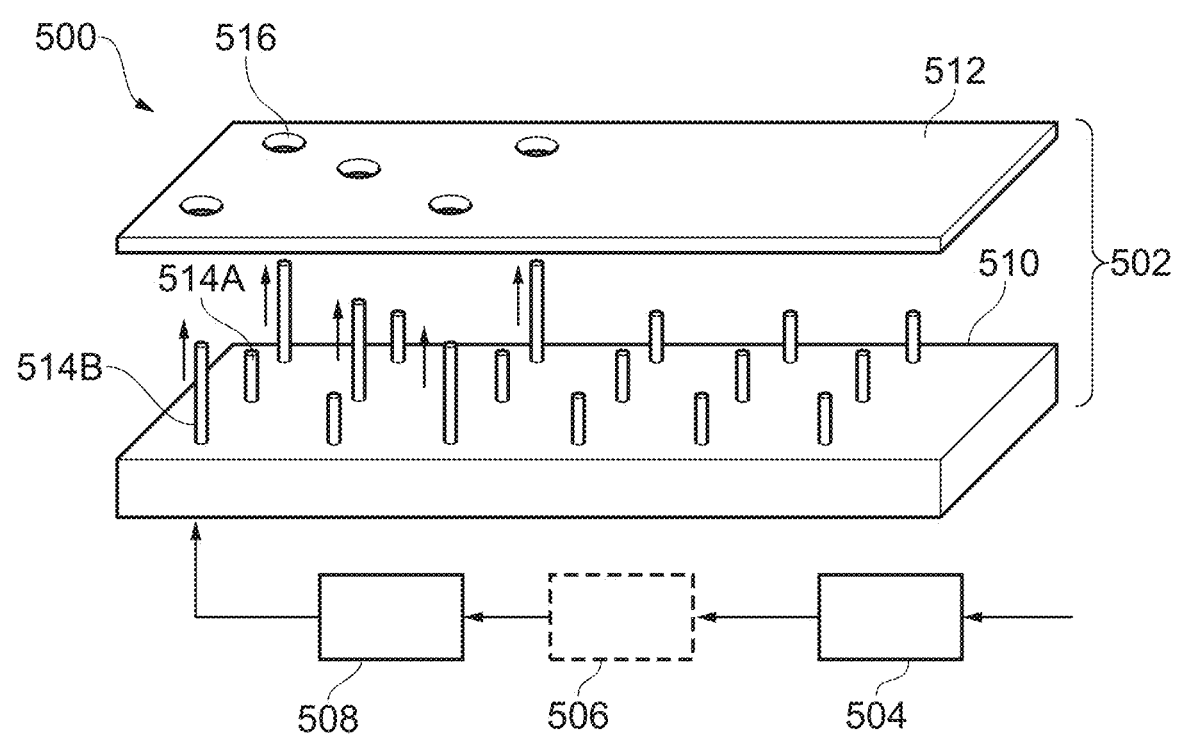
FIG. 5 shows schematically the rendering of braille by a first tactile output device.
Figure 6:
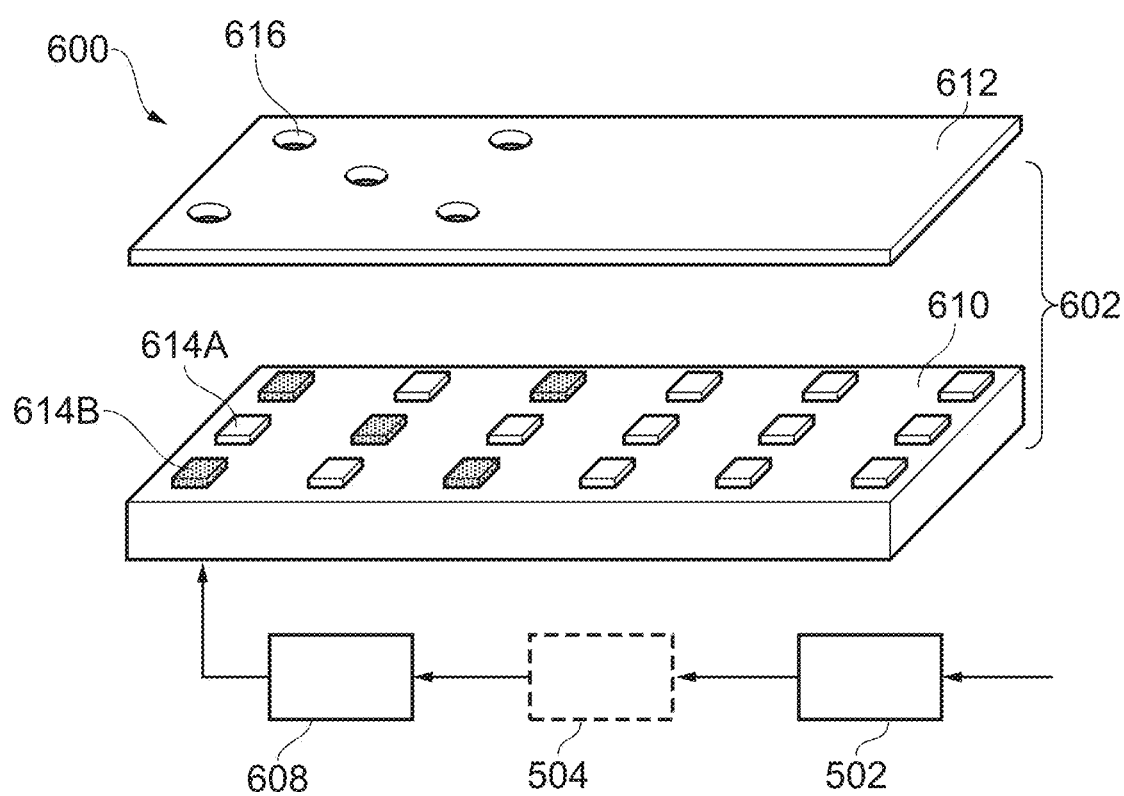
FIG. 6 shows schematically the rendering of braille by a second tactile output device.

FIG. 5 shows schematically a portable device 500 in accordance with a first embodiment of the present invention. In FIG. 5, the portable device 500 comprises a tactile pad 502, a communication interface 504 for receiving text information; a braille unit 506 for translating the received text information into braille; and a controller 508 (i.e. in the form of one or more processors) for controlling the tactile output of a plurality of touch elements. In FIGS. 5 and 6, the braille unit is shown in dashed because this function may be performed outside of the portable device, as described further herein.

The tactile pad 502 comprises a lower layer 510 at which the plurality of touch elements are provided and an upper layer 512 for receiving the tactile output generated by the touch elements. In the example shown in FIG. 5, the touch elements correspond to pins 514. The corresponding braille generated by the pins 514 is shown as deformations 516 in the upper surface. In the example shown in FIG. 5, the braille corresponds to the English word 'ok'. It will be appreciated that FIG. 5, the number of pins 514 and their spacing is shown for clarity, and that in reality, there will be a larger number of pins 514 with smaller spacing.

The braille translator 506 may include a database (in the form of software) for mapping characters in one or more languages to corresponding braille characters. For the characters that do not have a braille equivalent, the braille translator 506 may be configured to generate a braille equivalent corresponding to e.g. a simplified version of that character formed of discrete dots. The braille version of the received text information, or a portion thereof, is transmitted to the controller 508 from the braille translator 506.

In some examples, the portable device 500 may not comprise a braille translator 506 but instead receive the braille translation from the information processing apparatus (via the games controller 100). This may be desirable where for example, there is a relatively large amount of text to be translated, or where e.g. it is not practical to store a translation between multiple different language characters and the corresponding braille. In these examples, the translation of the text information may be performed by the information processing apparatus, for example, via an internet connection to a translation service, with the text information received at the communication interface 504 including the braille translation.

Additionally or alternatively, a video game may be pre-programmed with braille translations of the in-game text in a specific language (e.g. tailored to the territory it is being sold in), and the information processing apparatus may be configured to provide these translations to the portable device 500 (as text information).

The controller 508 is configured to control the tactile output of at least some touch elements, based on the braille information received from the braille translator 506 or received directly as text information at the communication interface 504.

In FIG. 5, this corresponds to selecting one or more pins and controlling the size and/or vertical displacement of those pins so as to render a portion of text in braille at the touchpad. The controller 508 may be configured to assign a subset of pins to each braille character that is to be rendered, and to then determine the relative displacement (and or size) of each pin within that subset. In some examples, the number of pins assigned to each braille character may be known in advance (e.g. at least two by three), and the controller 508 may simply determine which of the pins in each subset are to have their size and or vertical displacement adjusted.

The amount of text that is to be rendered in braille by the touchpad may be controlled by the controller 508. For example, it may be known in advance that a maximum of e.g. 20 characters can be rendered in braille at the tactile pad 502. Each character may be defined by e.g. a 3 by 2 (row×column) set of pins. In some examples, each character may have a finer granularity than this, with each 'dot' in a given character being created by multiple pins. The controller 508 may be configured to determine a maximum number of complete words that can be output using the 20 characters available, and to control the pins so as to output this number of words.

In other examples, the maximum number of complete words that can be output by the tactile pad 502 may be known in advance, and the communication interface 504 or braille translator 506 may be configured to receive or sub-divide the received text information in this way.

The size and or vertical displacement of the pins 514 may be controlled using actuators. For example, the touchpad may comprise a plurality of actuators, with each actuator being operable to control the size and or displacement of one or more respective pins 514. In some examples, the actuators may comprise MEMs devices to which one or more pins 514 are attached. The controller 508 may be operable to control the size and or vertical displacement of the pins 514 by controlling a voltage that is applied to the one or more actuators.

The actuators may be used to move the pins 514 towards or away from the upper surface layer. This may involve moving the whole of the pin 514 or an extendable portion of the pin. In some examples, each pin 514 may consist of an inner portion and an outer portion, with the inner portion being movable relative to the outer portion. The inner portion may be moved up and out of the outer portion so as to increase the apparent length of the pin 514. This may involve using the actuators to push the inner portion out of the outer portion, for example.

In FIG. 5, a first subset of pins 514A is shown as being in a default state, corresponding to a default position and or size. The pins that are being used to render braille are shown as a second subset 514B. In FIG. 5, it can be seen that the second subset of pins 514B are in an active state, corresponding to a vertical displacement and/or extension in length.

In FIG. 5, the pins 514 are shown as generating deformations 516 in respective portions of the upper layer 512. The upper layer 512 is made of a flexible synthetic material, such as rubber, and is located above the plurality of pins 514. The flexible layer may be relatively thin so as to allow the user to feel the deformations 516 created by the pins, but not so thin as to be pierced by them. In other embodiments, there may be no flexible layer and the user may be able to touch the pins 514 directly. In these embodiments, the upper layer 512 may comprise a plurality of holes, one for each pin 514, through which each pin 514 can be raised and lowered. As will be appreciated, for these embodiments, the pins 514 will need a blunt (e.g. round) top, to ensure that the user can interact with them safely.

In some embodiments, the size of the pins 514 may be controlled using a fluid. For example, each pin 514 may comprise a chamber for receiving a fluid and a valve for controlling the amount of fluid that the chamber is filled with. The walls of the pins 514 may be made of an elastic material that expands under pressure from the fluid and this expansion may be used to create a protrusion of a desired height in the upper layer 512. The amount of fluid required to generate such a protrusion may be known in advance and the controller 508 may be configured to selectively cause pins 514 to be filled with this amount of fluid. The controller 508 may also be configured to selectively cause fluid to be drained from the pins 514. The controller 508 may control this filling and draining of the pins 514 by controlling the position of the valves associated with each pin 514. In such embodiments, the lower layer 510 may comprise a reservoir (not shown) of fluid for filling the pins 514 and a plurality of channels connecting the reservoir to the plurality of pins 514.

In some embodiments, the upper layer 512 comprises one or more touch sensors (not shown). Each touch sensor may correspond to a capacitive or resistive touch sensor, for example. In some examples, the upper layer 512 may act as a touch screen, such that a single or multi-touch input can be detected at any location on the upper layer 512. The touch input detected by the touch sensor(s) is provided to the controller 508, which then determines whether or not to update the text rendered at the tactile pad 502. As described previously, a new portion of text may be rendered if it is determined that a user has felt all of the braille currently being rendered at the tactile pad 502. This may involve detecting whether a touch input has been received at locations coinciding with, or being located between, the locations at which braille is being rendered at the upper layer 512. In other examples, new text may be rendered in response to a user pressing a physical button, such as those described previously in relation to FIG. 3.

In some examples, the lower layer 510 may comprise a touch sensor configured to detect small changes in height of the pins that are in an active state. These small changes in height may correspond to the action of a user moving their finger over the active pins 514B. The controller 508 may be configured to determine whether touch inputs have been received at each of the locations corresponding to active pins 514B, and in response thereto, display a new (i.e. different) portion of braille at the upper layer 512. This may provide a more accurate means for determining whether a user has finished reading (i.e. feeling) the currently rendered braille. However, the ability to detect such small variations in height may be limited by the size and thickness of the tactile pad 502.

FIG. 6 shows schematically an example of a portable device 600 in accordance with a second embodiment of the present invention. The portable device 600 comprises the communication interface 504 and braille translator 506 described previously in relation to FIG. 5. The portable device 600 differs from that shown in FIG. 5 in that the lower layer 610 is provided with a plurality of haptic output devices, in this case, vibrators 612, for generating a tactile output at the upper layer. In this embodiment, the touch elements comprise vibrators 614.

The controller 608 is configured to control a vibration output by the one or more vibrators 614, so as to control a perceived friction at different locations on the upper layer 612. The perceived friction at different locations on the upper layer 612 is controlled so as to render braille at the upper layer 612 of the touchpad. Each location of increased friction may correspond to a dot in a braille character, for example. A user may read these dots by running their finger across the upper layer 612 and experiencing the variations in friction. One or more vibrators 614 may be used for generating each dot in a braille character.

In FIG. 6, a first subset of vibrators 614A are shown in an inactive state, i.e. not vibrating, and a second subset of vibrators 614B are show as being in an active state, i.e. vibrating. The corresponding locations on the upper layer 612 for which the friction is increased is indicated at dot locations 616. The controller 608 is configured to selectively control the vibrators 614 so as to output a portion of the received text information in braille. In FIG. 6, the word "Ok" has been rendered in braille by the vibrators 614A in an active state.

It will be appreciated that in FIG. 6, a small number of vibrators 614 with relatively large spacing is shown for clarity. In some examples, there will be a larger number of vibrators 614 with smaller spacing, allowing for finer control over the friction perceived at different locations on the upper layer 612. In turn, this will allow for larger number of braille characters to be rendered by tactile pad 602.

In some examples of the second embodiment, the upper layer 612 may act as a touch sensitive surface so that touch inputs received at the upper layer 612 can be detected. The controller 606 may be configured to receive an indication of the detected touch inputs and determine whether a user has performed a touch gesture corresponding to moving their finger over the upper layer 612 (e.g. from left to right in a continuous motion). If it is determined that a user has performed such a gesture, the controller 606 may control the vibrators 614 so as to output e.g. a following portion of braille in the body of braille that is to be rendered. In some examples, the controller may be configured to perform different actions based on the type of touch input detected at the upper layer 612. For example, a user might skip to the end of the body of text by double-tapping a right-hand side of the upper layer 612; similarly, the user might skip to the beginning of the text by double-tapping the left hand-side of the upper layer 612.

Although no physical buttons are shown in FIGS. 5 and 6, it will be appreciated that the portable devices 500, 600 shown in FIGS. 5 and 6 may include physical buttons for performing different operations. The physical buttons may correspond to any of those described previously in relation to FIG. 3. In some cases, a touch gesture may be used for causing successive portions of text to be rendered at the touch pad. Different buttons or types of touch input may be used for rendering a next chapter of the received text information. In the context of a video game, a 'chapter' may correspond to a different menu that is currently being displayed at a screen. For example, the user may currently be feeling text relating to a description of an in-game item (e.g. 'Epic' in FIG. 2) but may instead wish to skip to a menu showing the statistics associated with this item (e.g. 'HP 185/239, level 4 . . . ' in FIG. 2).

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system comprising:
a portable device for providing tactile feedback to a user; and
a handheld games controller having a touch sensitive surface on an upper surface thereof, and a receiving portion for securing the portable device to the handheld games controller via a connecting portion;
the portable device comprising:
a communication interface operable to receive text information;
a tactile pad comprising a plurality of touch elements for generating a respective tactile output;
the connecting portion for securing the portable device to the handheld games controller; and
a processor configured to receive the text information and to control the tactile output of at least some of the touch elements based on the received text information; wherein
the portable device is positioned over the touch sensitive surface; and
pressure applied by the user onto the portable device is relayed to the touch sensitive surface of the handheld games controller.

2. The system according to claim 1, wherein the tactile pad comprises:
a flexible layer;
a plurality of pins arranged below the flexible layer; and
a plurality of actuators, each actuator being operable to control at least one of a displacement and size of one or more respective pins so as to deform the flexible layer; wherein the touch elements comprise the plurality of pins, the processor being configured to control at least one of the displacement and size of the pins based on the received text information.

3. The system according to claim 1, wherein:
the plurality of touch elements include a plurality of haptic output devices operable to generate a haptic tactile output by controlling a perceived friction at different locations on the touchpad; and
the processor is configured to control the haptic tactile output of at least some of the haptic output devices based on the received text information.

4. The system according to claim 1, wherein
the processor is configured to map the received text information to braille; and
the processor is configured to control the tactile output of at least some of the touch elements so as to output a first portion of the received text information in braille.

5. The system according to claim 1, wherein
the communication interface is configured to receive text information comprising braille; and
the processor is configured to control the tactile output of at least some of the touch elements so as to output a first portion of the received braille.

6. The system according to claim 4, comprising:
a touch sensor configured to detect locations on the tactile pad at which touch inputs are received;
wherein the processor is configured to determine whether a received touch input corresponds to the user having moved their finger across the first portion of text output in braille, and in response thereto, control at least some of the touch elements so as to output a second portion of the received text in braille.

7. The system according to claim 6, wherein the processor is configured to cause the first portion of text in braille to be output at a higher position on the tactile pad, or to cause at least some of the first portion of text to no longer be output by the touch elements, in response to detecting that the user has moved their finger across the first portion of text in braille.

8. The system according to claim 4, comprising at least one physical button being operable to control a portion of the received text information that is to be output by the touch elements in braille.

9. The system according to claim 4, wherein the processor is configured to receive input signals generated at the handheld games controller, and to control the portion of text information that is to be output by the touch elements, based on the input signals received from the handheld games controller.

10. The system according to claim 1, comprising an electrical connector for receiving power from the handheld games controller.

11. The system according to claim 1, wherein
the handheld games controller comprises left and right hold portions to be held by the user and a central section interconnecting the left and right hold sections; and
the receiving portion is arranged such that the portable device is securable to the central section.

12. The system according to claim 1, wherein
the handheld games controller comprises left and right hold portions to be held by the user and a central section interconnecting the left and right hold sections; and
the receiving portion is arranged such that the portable device is securable to a rear surface of the central section, the rear surface being accessible by at least one of the user's fingers when the user is gripping at least one of the left and right hold portions in their palms.

13. The system according to claim 1, comprising:
a video game machine operable to execute a video game, the video game machine being operable to transmit text information to the portable device;
wherein the communication interface of the portable device is configured to receive the text information originating from the video game machine.

14. The system according to claim 13, wherein
in a first mode of the video game machine, one or more inputs of the handheld games controller are interpreted by as controls for a videogame running on the machine; and
in a second mode of the video game machine, selected in response to a predetermined action by the user, the one or more inputs of the handheld games controller are instead interpreted by the video game machine as controls for tactile output of text information by the portable device.

\* \* \* \* \*